United States Patent [19]

Selders

[11] Patent Number: 5,787,543
[45] Date of Patent: Aug. 4, 1998

[54] HEATED WINDSHIELD WIPER BLADE

[75] Inventor: Arthur W. Selders, 108 Oakview Dr., Morgantown, W. Va. 26505-2329

[73] Assignee: Arthur W. Selders, Morgantown, W. Va.

[21] Appl. No.: 648,438

[22] Filed: May 15, 1996

[51] Int. Cl.$^6$ .................................................. B60S 1/38
[52] U.S. Cl. ................... 15/250.06; 219/202; 15/250.48
[58] Field of Search ........................ 15/250.06, 250.08, 15/250.07, 250.09, 250.48, 250.41; 219/202, 203

[56] References Cited

U.S. PATENT DOCUMENTS

| | | | |
|---|---|---|---|
| 2,194,671 | 3/1940 | Pauro | 15/250.06 |
| 3,201,818 | 8/1965 | Linker | 15/250.06 |
| 3,372,421 | 3/1968 | Meltzer | 15/250.06 |
| 3,428,993 | 2/1969 | Rickett | 15/250.06 |
| 3,639,938 | 2/1972 | Golden | 15/250.06 |
| 4,473,919 | 10/1984 | Fritz, Jr. | 15/250.48 |
| 4,497,083 | 2/1985 | Nielsen, Jr. et al. | 15/250.06 |
| 4,928,345 | 5/1990 | Meltzer et al. | 15/250.06 |
| 5,426,814 | 6/1995 | Minnick | 15/250.06 |
| 5,488,752 | 2/1996 | Randolph | 15/250.06 |
| 5,504,965 | 4/1996 | Guell | 15/250.06 |

Primary Examiner—Gary K. Graham

[57] ABSTRACT

A windshield wiper blade having an internal conduit extending throughout the length of the wiper blade body through which an electric heating element is placed provides a means to address a wintertime problem of windshield wiper icing and freeze-up causing the wiper blade to lose flexibility and not sweep the curved windshield commonly found on most motor vehicles clear enough for good driving visibility. The preferred means to address this problem is to provide an electrical heat element within the wiper blade body of about the same linear length as the wiper blade body. Additionally, in the present invention, a low-cost resistance wire type heat element that can be cut to accommodate various wiper blade lengths is used. The heat element comprises a flexible spiraled resistance wire coiled around stranded fiberglass, the whole of which is encapsulated in a silicone rubber jacket. The heat element is energized with the connection of insulated power supply wires from each heat element end to the vehicle electrical system to provide an electrical current to the heat element which generates heat output through the wiper body when the heat element is activated. The electrical heat output is adequate to sustain the flexibility of the wiper blade resulting in better wiper performance and thus better driving visibility in severe winter conditions.

1 Claim, 1 Drawing Sheet

HEATED WINDSHIELD WIPER BLADE

BACKGROUND OF THE INVENTION

This invention addresses a problem with motor vehicle windshield wipers when driving in cold winter conditions, particularly, with snowy and freezing rain or sleet situations. The wipers do not always perform adequately to provide good driving visibility. Most automobiles have slightly curved windshields rather than being flat. Because of this windshield curvature, wiper blades must flex slightly as they sweep back and forth across the windshield.

Vehicle defrost-deice systems are not always adequate in severe winter driving conditions to keep the windshield warm enough to prevent icing, especially on the outer edges of the windshield. As ice freezes on the windshield, it also freezes on the wiper blades causing the blades to lose their flexibility, resulting in the blades not sweeping the windshield clean enough for good driving visibility. In heavy traffic situations, road spray from other vehicles contribute to the windshield wiper freeze-up and poor visibility problems.

BRIEF SUMMARY OF THE INVENTION

The objective of the invention is to provide a low-cost heated windshield wiper blade for motor vehicles to use in cold, snowy, freezing rain, sleet and other winter driving conditions. Many existing windshield wiper and defrost-deicing systems do not perform adequately to provide good driving visibility in severe winter conditions.

A second important objective of the invention is to make motor vehicle operation safer in wintertime driving conditions by providing equipment for motor vehicles of all types that will improve driving visibility, and hopefully reduce motor vehicle accidents, injuries and fatalities. The invention has a very low energy and power requirement, utilizing a very small portion of the electrical energy and power available in today's motor vehicles.

DESCRIPTION OF THE PREFERRED EMBODIMENT

It should be noted the components and structure of the present invention as illustrated and described hereafter are not only means to structure and assemble the various components to develop a heated windshield wiper blade unit compatible for use on motor vehicle windshields in wintertime. It should also be noted here that one present invention objective is to develop equipment that will help make winter vehicle operation safer with better driving visibility in severe winter conditions.

Figure 1:
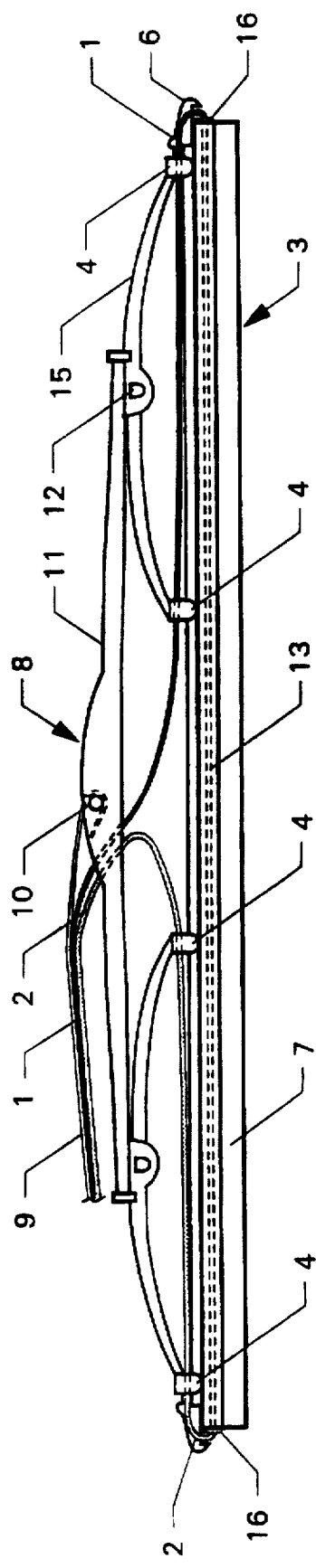
FIG. 1 is a perspective view of the heated windshield wiper blade assembly mounted on a typical windshield wiper blade arm in accordance with the preferred embodiment of the present invention.
Figure 3:
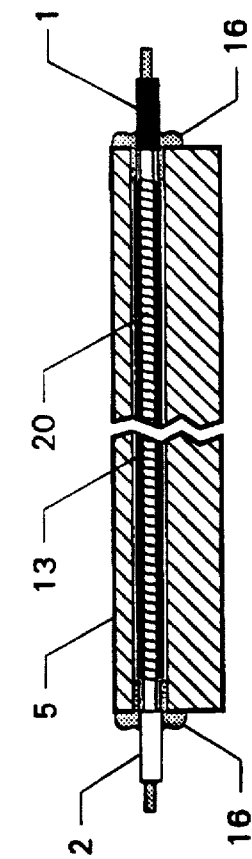
FIG. 3 is a longitudinal section view of the heated blade with partially exposed portion showing the spiraled heating element, electrical hook-up and wiper end closure.
Figure 2:
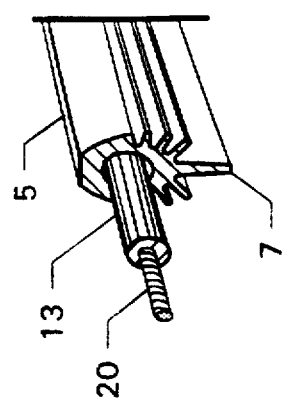
FIG. 2 is an enlarged perspective view of a portion of the heated wiper blade body showing heating element partially exposed from the wiper blade conduit.

The present preferred embodiment of the invention will be better understood with reference to FIG. 1–3, wherein like parts are designated by like numerals.

Shown in FIG. 1 is heated wiper blade assembly 3, which comprises in part a conventional type of wiper blade with the additional embodiment of an electrical heating apparatus powered from the vehicle electrical system. Wiper blade assembly 3 is attached to a conventional type wiper blade support structure 8 A small wiper blade arm 9 extends from a pin connector 10 at the support structure to a wiper motor shaft (not shown). The art of the present manner of utilizing a reciprocating wiper motor shaft for wiper blade movement across a vehicle windshield via a wiper blade arm is well established, hence no further description in this embodiment.

Insulated electrical power supply wire 1 carries current to the first (right) end of heat element 13. Insulated electrical power supply wire 2 carries current to the second (left) end of said heat element 13 to close the circuit. Insulated power supply wire 1 and insulated power supply wire 2 from the vehicle electric circuit near the wiper motor shaft are routed under the wiper blade arm 9 Power supply wire 1 routing is continued from the wiper blade arm downward through the opening in wiper blade support structure 8 then forward through two blade carrier brackets 4 to the first end of blade. Power supply wire 2 routing is continued downward through the opening in wiper arm support structure 8, reversed in direction and routed through two blade carrier brackets 4 to the second end of the blade.

Wiper blade support structure 8 as shown in FIG. 1 not only comprises the structure necessary for routing power supply wire 1 and power supply wire 2 from the power source to the heating apparatus, but also includes elongated body member 11. On each end of elongated body member 11 is attached a cradle blade carrier 12 comprising pivotal attachment to body member 11. Each cradle blade carrier supports a cradle arm 15, which support wiper blade body 5 of the assembly 3. Dual blade carrier brackets 4 on each cradle arm allow blade body 5 to flex for different surface configurations upon which wiper blades must move.

Illustrated in FIG. 2 and FIG. 3 are details of the preferred embodiment for a low-cost heated windshield wiper blade comprising a multilipped wiper member 7 including blade wiper blade body 5 which contains a longitudinal conduit throughout the total length of the wiper blade body into which heat element 13 is inserted. In the present embodiment heat element 13 comprises spiraled resistance wire 20 coiled around stranded fiberglass, the whole of which is encapsulated in a silicone rubber jacket. Heat element 13 has an outside diameter inches. Insulated power supply wire 1 is connected to the first end of the heat element 13 with a connection. Likewise, insulated power supply wire 2 is connected in the same manner to the second end of heat element 13 with a connection. Plastic rubber 16 is employed to seal the blade body 5 at the connection of supply wires with the heating elements such that moisture cannot come into contact with the heating element.

I claim:

1. An electrically heated wiper blade assembly for wiping a windshield, said assembly comprising:
    a wiper blade support structure holding an elongated wiper blade;
        said wiper blade support structure including an elongated body member having opposing first and second ends with an opening therein therebetween, each end pivotally supporting an elongated cradle arm, each cradle arm having blade carrier brackets at opposing ends thereof,
        said elongated wiper blade including multiple longitudinal wiping lips for wiping the windshield and an elongated body supporting said lips, said elongated body having opposing end faces, said elongated body having a longitudinal passageway extending therethrough open at both said faces, said body is coupled to and carried by the blade carrier brackets;

an elongated heating element having first and second ends inserted into the longitudinal passageway;

said heating element including spiraled resistance wire coiled around stranded fiberglass, the combination of which is encapsulated in a silicone rubber jacket;

first and second power supply wires leading from a vehicle power supply to respective first and second ends of the heating element and being coupled thereto;

the first supply wire passing through the opening and through both blade carrier brackets of one of the cradle arms and the second supply wire passing through the opening and through both blade carrier brackets of the other of the cradle arms;

plastic rubber sealing means provided on both end faces and between the body and the supply wires to prevent moisture from entering the passageway and contacting the heating element.

* * * * *